US007923513B2

(12) United States Patent
Killilea et al.

(10) Patent No.: US 7,923,513 B2
(45) Date of Patent: Apr. 12, 2011

(54) COATING COMPOSITIONS AND METHODS

(75) Inventors: T. Howard Killilea, North Oaks, MN (US); James M. Bohannon, High Point, NC (US)

(73) Assignee: Valspar Sourcing, Inc., Minneapolis, MN (US)

( * ) Notice: Subject to any disclaimer, the term of this patent is extended or adjusted under 35 U.S.C. 154(b) by 741 days.

(21) Appl. No.: 11/281,167

(22) Filed: Nov. 17, 2005

(65) Prior Publication Data

US 2006/0111503 A1 May 25, 2006

Related U.S. Application Data

(60) Provisional application No. 60/629,934, filed on Nov. 22, 2004.

(51) Int. Cl.
| C09D 201/00 | (2006.01) |
| C09D 5/02 | (2006.01) |
| C09D 175/04 | (2006.01) |
| C09D 4/00 | (2006.01) |
| C09D 4/06 | (2006.01) |

(52) U.S. Cl. .......................... 525/242; 525/313; 524/501
(58) Field of Classification Search .................. 525/242, 525/313; 524/501
See application file for complete search history.

(56) References Cited

U.S. PATENT DOCUMENTS

| | | | |
|---|---|---|---|
| 3,125,592 A | 3/1964 | Nevin | |
| 3,297,745 A | 1/1967 | Fekete et al. | |
| 3,373,075 A | 3/1968 | Fekete et al. | |
| 3,380,831 A | 4/1968 | Cohen et al. | |
| 3,530,100 A | 9/1970 | D'Alelio | |
| 3,551,246 A | 12/1970 | Bassemir et al. | |
| 3,560,237 A | 2/1971 | Miller | |
| 3,567,494 A | 3/1971 | Fitko | |
| 3,673,140 A | 6/1972 | Ackerman et al. | |
| 3,676,398 A | 7/1972 | D'Alelio | |
| 3,700,643 A | 10/1972 | Smith et al. | |
| 3,759,809 A | 9/1973 | Carlick et al. | |
| 3,876,518 A | 4/1975 | Borden et al. | |
| 3,878,077 A | 4/1975 | Borden et al. | |
| 3,935,173 A | 1/1976 | Ogasawara et al. | |
| 4,906,684 A | 3/1990 | Say | |
| 5,026,771 A | 6/1991 | Dupont et al. | |
| 5,047,270 A | 9/1991 | Mori et al. | |
| 5,089,376 A | 2/1992 | Setthachayanon | |
| 5,290,663 A | 3/1994 | Huynh-Tran | |
| 5,371,148 A | 12/1994 | Taylor et al. | |
| 5,484,849 A | 1/1996 | Bors et al. | |
| 5,543,557 A | 8/1996 | Bergvall | |
| 5,562,953 A | 10/1996 | Bors et al. | |
| 6,048,471 A | 4/2000 | Henry | |
| 6,075,088 A | 6/2000 | Braeken | |
| 6,162,842 A | 12/2000 | Freche et al. | |
| 6,197,844 B1 | 3/2001 | Hamrock et al. | |
| 6,462,127 B1 | 10/2002 | Ingrisch et al. | |
| 6,747,088 B1 | 6/2004 | Schwalm et al. | |
| 6,822,014 B2 | 11/2004 | Katou | |
| 6,964,999 B1 | 11/2005 | Nakagawa et al. | |
| 6,987,135 B2 | 1/2006 | Van Den Berg et al. | |
| 6,997,980 B2 | 2/2006 | Wegner et al. | |
| 2002/0156145 A1* | 10/2002 | Van Den Berg et al. | ........ 522/84 |
| 2002/0164434 A1 | 11/2002 | Tarvin et al. | |
| 2003/0065047 A1 | 4/2003 | Katou | |
| 2003/0228424 A1 | 12/2003 | Dove et al. | |
| 2004/0254293 A1 | 12/2004 | Killilea et al. | |
| 2005/0192400 A1 | 9/2005 | Killilea et al. | |
| 2010/0004376 A1 | 1/2010 | Killilea et al. | |
| 2010/0249317 A1 | 9/2010 | Killilea et al. | |

FOREIGN PATENT DOCUMENTS

| DE | 44 40 819 A1 | 5/1995 |
|---|---|---|
| EP | 0 492 847 A2 | 12/1991 |
| EP | 0 492 847 B1 | 1/1992 |
| EP | 0 486 278 A1 | 5/1992 |
| EP | 486278 A1 * | 5/1992 |
| EP | 0 492 847 A3 | 2/1993 |
| EP | 0 651 039 A | 5/1995 |
| EP | 0 939 109 A1 | 9/1999 |
| EP | 0965621 | 12/1999 |
| EP | 965621 A1 * | 12/1999 |
| EP | 1 059 308 A1 | 12/2000 |
| EP | 0 492 847 B2 | 11/2002 |
| EP | 1 059 308 B1 | 11/2006 |
| GB | 1 541 891 | 3/1979 |
| JP | 53-97083 | 8/1978 |
| JP | 57 078468 | 5/1982 |
| JP | 1-168767 | 7/1989 |
| JP | 11-034809 | 2/1999 |
| JP | 2000-136211 | 5/2000 |
| JP | 2002-173516 | 6/2002 |
| JP | 2002-322391 | 11/2002 |
| JP | 2003-511531 | 3/2003 |
| JP | 2003-238844 | 8/2003 |

(Continued)

OTHER PUBLICATIONS

Product Data Sheet, Alberdingk Boley, Inc., Greensboro, N.C., Alberdingk® LUX 399 UV-Dispersion,, Published Aug. 22, 2002, 2 pgs.

Safety Data Sheet, Alberdingk Boley, Inc., Greensboro, N.C., Alberdingk® LUX 399 UV-Dispersion, Published May 19, 2004, 4 sheets.

Koleske et al., "2003 Additives Guide," *Paint and Coatings Industry*, Apr. 2003, pp. 12-86.

Database WPI Week 1989321, Derwent Publications Ltd., London, GB: AN 1989-23274, XP002325321 "Active energy ray cure coating composition" and JP 01 168767 A (Toyo INK) Jul. 4, 1989.

(Continued)

*Primary Examiner* — Kelechi C Egwim
(74) *Attorney, Agent, or Firm* — Mueting Raasch & Gebhardt, P.A.

(57) ABSTRACT

The present invention provides coating compositions that include substantially non-irritating ethylenically unsaturated compounds and have one or more of the following properties: high performance, low VOC levels, substantially no formaldehyde content, and low irritation levels.

29 Claims, No Drawings

FOREIGN PATENT DOCUMENTS

| | | |
|---|---|---|
| WO | 93/16133 | 8/1993 |
| WO | 93/16133 A2 | 8/1993 |
| WO | 93/16133 A3 | 8/1993 |
| WO | 01 27181 A | 4/2001 |
| WO | WO 01/23453 A1 | 4/2001 |
| WO | 02/34808 A1 | 5/2002 |
| WO | WO 02/053658 A2 | 7/2002 |
| WO | 2004 111143 A2 | 12/2004 |
| WO | WO 2004/111143 A3 | 12/2004 |

OTHER PUBLICATIONS

Database WPI Week 198225, Derwent Publications Ltd., London, GB: AN 1982-51399E, XP002376349, Patent Abstracts of Japan. vol. 006, No. 158 (C-120), Aug. 19, 1982, and JP 57 078468 A (Dainippon Printing Co. LTD), May 17, 1982.

U.S. Federal Register, vol. 60, No. 116, Jun. 16, 1995, pp. 31633-31637.

Draize et al., "Methods for the Study of Irritation and Toxicity of Substances Applied Topically to the Skin and Mucous Membranes," *J. Pharmacol. Exp. Ther.*, 1944; 82(3):377-390.

"Draize test," Wikipedia [online]. [retrieved on Oct. 22, 2008]. <URL:http://en.wikipedia.org/wiki/Draize_test>; 6 pgs. (Page last modified Oct. 5, 2008).

"Sartomer Company Material Safety Data Sheet— Product SR295" datasheet. Sartomer Company, Inc., Exton, PA, revised: Jul. 27, 2005 (replaces data sheet of Oct. 5, 2004). printed Jul. 27, 2005, 7 pgs.

"Sartomer Safety Data Sheet—- CRAYNOR 132" datasheet. Cray Valley, Rieux, France, version: Jul. 15, 2002 (supersedes datasheet of Dec. 1, 1999). printed Aug. 4, 2005, 5 pgs.

"Trimethylolpropane trimethacrylate," datasheet [online]. chemBlink Inc., Cary, NC, © 2008 [retrieved on Oct. 21, 2008]. Retrieved from the Internet:<URL:http://www.chemblink.com/products/3290-92-4.htm>; 2 pgs.

Whelan, "Polymer Chemical Dictionary," Chapman and Hall, Inc., New York, NY, 1994, p. 413.

Rempp et al., "Polymer Synthesis," $2^{nd}$ Ed., Huthig & Wepf, New York, NY, 1991, pp. 52-53.

"Oil" [online], Wikipedia Foundation, Inc., San Francisco, CA, retrieved from the internet Aug. 17, 2010 at <URL:http://en.wikipedia.org/wiki/Oil>; 4 pgs.

* cited by examiner

COATING COMPOSITIONS AND METHODS

This application claims the benefit of the U.S. Provisional Application No. 60/629,934, filed Nov. 22, 2004, which is incorporated by reference in its entirety.

BACKGROUND

There is a significant need for lower VOC-containing (volatile organic compound-containing) and formaldehyde-free systems in the coatings industry due to increasing environmental restrictions. Aqueous-based thermoplastic coatings, such as latexes can be applied with low levels of solvents and formaldehyde, but they do not have the hardness and chemical resistance required for many applications. Chemically crosslinked coatings, such as aqueous-based melamine cured coatings, that give good block and chemical resistance contain low levels of formaldehyde. For interior applications such as coatings for kitchen cabinets, many consumers desire "Green" systems, which are carcinogen free. Other crosslinking technologies such as blocked isocyanates or ethylenically unsaturated compounds also achieve the desired performance; however, these technologies are often cost prohibitive or highly irritating either to skin, eyes, or both.

Thus, what is needed are coating compositions that have one or more of the following properties: high performance, low VOC levels, substantially no formaldehyde content; and low irritation levels.

SUMMARY

The present invention provides coating compositions. Preferred compositions possess one or more of the following properties: low VOC levels, low irritation levels, substantially no formaldehyde content, and high performance. Certain embodiments of the present invention include water and a latex polymer. In certain embodiments, the compositions also include a water-dispersible polymer in addition to the latex polymer.

Preferred water-dispersed coating compositions include no more than 7 weight percent (wt-%) (more preferably, no more than 4 wt-%) volatile organic compounds (VOC).

In one embodiment, a coating composition is provided that includes: a polymer component that includes a latex polymer; a substantially non-irritating ethylenically unsaturated compound; and water; wherein the substantially non-irritating ethylenically unsaturated compound: has a molecular weight of at least 350 grams/mole, is substantially free of ethylene oxide moieties, propylene oxide moieties, and primary hydroxyl functionality, has an average ethylenically unsaturated vinyl functionality of at least 3.0, and has a viscosity at 25° C. of no greater than 2,000 cps.

The substantially non-irritating ethylenically unsaturated compound can include (meth)acrylate functionality (wherein "(meth)acrylate" refers to an acrylate and a methacrylate), vinyl ether functionality, (meth)allyl ether functionality (wherein (meth)allyl ether refers to an allyl ether and a methallyl ether), or mixtures thereof. Preferably, the substantially non-irritating ethylenically unsaturated compound includes (meth)acrylate functionality. Examples of (meth)acrylate-functional compounds include those selected from the group consisting of di-trimethylolpropane tetraacrylate, di-trimethylolpropane tetramethacrylate, and mixtures thereof.

Compositions of the present invention include a latex polymer. Preferably, the latex polymer is prepared via chain-growth polymerization, using, for example, ethylenically unsaturated monomers. The ethylenically unsaturated monomers are preferably selected from the group consisting of acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidylether, acrylamide, methylacrylamide, styrene, α-methyl styrene, vinyl toluene, vinyl acetate, vinyl propionate, allyl methacrylate, and mixtures thereof.

Preferably, the ethylenically unsaturated monomers used in the preparation of the latex polymer include styrene. In certain embodiments, the coating composition includes no greater than 75 percent by weight (wt-%) styrene, and in other embodiments, no greater than 50 wt-%, based on the total weight of the latex polymer composition. In certain embodiments, the level of styrene is no less than 10 wt-%, in other embodiments, no less than 20 wt-%, based on the total weight of the latex polymer composition (i.e., the components used in preparing the latex polymer).

In certain embodiments, a coating composition is provided that includes: a polymer component that includes a latex polymer and a water-dispersible polymer; a substantially non-irritating ethylenically unsaturated compound; and water; wherein the substantially non-irritating ethylenically unsaturated compound: has a molecular weight of at least 350 grams/mole, is substantially free of ethylene oxide moieties, propylene oxide moieties, and primary hydroxyl functionality, has an average ethylenically unsaturated vinyl functionality of at least 3.0, and has a viscosity at 25° C. of no greater than 2,000 cps.

The water-dispersible polymer is preferably selected from the group consisting of polyurethanes, epoxies, polyamides, chlorinated polyolefins, acrylics, oil-modified polymers, polyesters, and mixtures or copolymers thereof. Preferably, the water-dispersible polymer is a water-dispersible polyurethane.

The present invention also provides methods for coating that involve applying a coating composition to a substrate and allowing the coating composition to harden. The present invention also provides coatings prepared or preparable from the coating compositions described herein. For example, a coating of the present invention is preparable by a method that involves applying a coating composition of the present invention to a substrate and allowing the coating composition to harden.

The present invention also provides a method of preparing a coating composition.

In one embodiment, the method involves: mixing water, a latex polymer, and a substantially non-irritating ethylenically unsaturated compound, wherein the ethylenically unsaturated compound: has a molecular weight of at least 350 grams/mole, is substantially free of ethylene oxide moieties, propylene oxide moieties, and primary hydroxyl functionality, has an ethylenically unsaturated functionality of at least 3.0, and has a viscosity at 25° C. of no greater than 2,000 cps.

In one embodiment, the method involves: mixing water, a surfactant, and a substantially non-irritating ethylenically unsaturated compound, wherein the ethylenically unsaturated compound: has a molecular weight of at least 350 grams/mole, is substantially free of ethylene oxide moieties, propylene oxide moieties, and primary hydroxyl functionality, has an ethylenically unsaturated functionality of at least 3.0, and has a viscosity at 25° C. of no greater than 2,000 cps; and blending this mixture with a latex polymer and water.

In one embodiment, the method involves: providing a first mixture that includes a water-dispersible polymer (preferably, a water-dispersible polyurethane polymer) and a substantially non-irritating ethylenically unsaturated compound, wherein the ethylenically unsaturated compound: has a molecular weight of at least 350 grams/mole, is substantially free of ethylene oxide moieties, propylene oxide moieties, and primary hydroxyl functionality, has an ethylenically unsaturated functionality of at least 3.0, and has a viscosity at 25° C. of no greater than 2,000 cps; providing a second mixture that includes water and a latex polymer; and combining the first and second mixtures to form the coating composition. Preferably, combining the first and second mixtures includes dispersing the first mixture in the second mixture. If the water-dispersible polymer is a polyurethane polymer, the method further includes chain extending the water-dispersible polyurethane polymer after combining the first and second mixtures.

As used herein, a "substantially non-irritating" compound has a Draize rating of no more than 1 for skin (on a scale of 0 to 8) and no more than 10 for eyes (on a scale of 0 to 110). An "essentially non-irritating" compound has a Draize rating of no more than 0.5 for skin and no more than 5 for eyes. A "completely non-irritating" compound has a Draize rating of no more than 0.1 for skin and no more than 3 for eyes.

As used here, a "latex" polymer means the polymer itself is not capable of being dispersed in water; rather, a latex polymer requires a secondary emulsifying agent (e.g., a surfactant) for creating an emulsion of polymer particles in water.

A "water-dispersible" polymer means the polymer is itself capable of being dispersed into water (i.e., without requiring the use of a separate surfactant), or water can be added to the polymer to form a stable aqueous dispersion (i.e., the dispersion should have at least one month shelf stability at normal storage temperatures). Such water-dispersible polymers can include nonionic or anionic functionality on the polymer, which assist in rendering them water-dispersible. For such polymers, external acids or bases are typically required for anionic stabilization; however, these are not the secondary emulsifying agents (e.g., surfactants) that are used to disperse a latex polymer.

Also herein, "a," "an," "the," "at least one," and "one or more" are used interchangeably.

Also herein, the recitations of numerical ranges by endpoints include all numbers subsumed within that range (e.g., 1 to 5 includes 1, 1.5, 2, 2.75, 3, 3.80, 4, 5, etc.).

Also herein, the terms "comprises" and variations thereof do not have a limiting meaning where these terms appear in the description and claims. Thus, a composition comprising an ethylenically unsaturated compound means that the composition includes one or more of the ethylenically unsaturated compounds.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Coating compositions of the present invention include a substantially non-irritating ethylenically unsaturated compound and a polymer, which can be water-dispersible or not. In preferred embodiments, when the substantially non-irritating ethylenically unsaturated compound is combined with the polymer, the composition has a low VOC level.

Preferably, coating compositions of the present invention have a viscosity below 100,000 cps, more preferably below 30,000 cps, even more preferably below 15,000 cps, even more preferably below 5,000 cps, and most preferably below 1,000 cps at processing or use conditions. Herein, viscosity is measured by a Brookfield DV-1+ Viscometer and a Number 31 spindle at 1.5 revolutions per minute (rpm).

Preferably, the coating compositions include no more than 7 weight percent (wt-%) volatile organic compounds, based on the total weight of the composition. More preferably, the coating compositions of the present invention include no more than 4 wt-% volatile organic compounds. Volatile organic compounds are defined in U.S. Pat. No. 6,048,471 (Henry) and in the U.S. federal Register, Volume 60, Number 116. Jun. 16, 1995, pages 31633-31637.

Coating compositions of the present invention preferably include an ethylenically unsaturated compound in an amount of at least 5 weight percent (wt-%), more preferably at least 7.5 wt-%, and most preferably at least 10 wt-%, based on the combined weight of the ethylenically unsaturated compound and the polymer component of the composition (e.g., latex polymer and other optional polymers such as water-dispersible polymers). Coating compositions of the present invention preferably include an ethylenically unsaturated compound in an amount of no more than 40 weight percent (wt-%), more preferably no more than 30 wt-%, and most preferably no more than 25 wt-%, based on the combined weight of the ethylenically unsaturated compound and the polymer component of the composition.

Coating compositions of the present invention preferably include at least 40 wt-% water, based on the total weight of the composition. Coating compositions of the present invention preferably include no more than 80 wt-% water, and more preferably no more than 70 wt-%, based on the total weight of the composition.

The coating compositions of the present invention may be applied to a variety of substrates including wood, cement, cement fiber board, tile, metal, plastic, glass, optical fibers, and fiberglass. Coating compositions can be applied to a substrate by a variety of methods known to those skilled in the art. Such methods include spraying, painting, rollcoating, brushing, fan coating, curtain coating, spreading, air knife coating, die-coating, vacuum coating, spin coating, electrodeposition, and dipping. The thickness of the coatings will vary with the application. Typically, the coatings will have a thickness of 0.1 to 20 mils (0.00025 to 0.0508 centimeters (cm)), however, thicker or thinner coatings are also contemplated depending on, for example, the desired coating properties.

Compounds that include ethylenically unsaturated functionality can be reactive monomers, oligomers, or low molecular weight polymers. Suitable such compounds typically have a relatively low molecular weight. Preferably, suitable such compounds have a molecular weight of at least 350 grams/mole (g/mol). Preferably, the molecular weight is no more than 1000 g/mol.

Preferred ethylenically unsaturated compounds of the composition are substantially non-irritating, more preferably essentially non-irritating, and most preferably completely non-irritating. If the ethylenically unsaturated component is provided as a mixture of compounds, the entire mixture is substantially non-irritating, preferably essentially non-irritating, and more preferably completely non-irritating.

A "substantially non-irritating" compound has a Draize rating of no more than 1 for skin (on a scale of 0 to 8) and no more than 10 for eyes (on a scale of 0 to 110). An "essentially non-irritating" compound has a Draize rating of no more than 0.5 for skin and no more than 5 for eyes. A "completely non-irritating" compound has a Draize rating of no more than 0.1 for skin and no more than 3 for eyes.

Preferred ethylenically unsaturated compounds are substantially free of ethylene oxide moieties, propylene oxide moieties, and primary hydroxyl functionality. More preferably, they are essentially free of ethylene oxide moieties, propylene oxide moieties, and primary hydroxyl functionality. Most preferably, they are completely free of ethylene oxide moieties, propylene oxide moieties, and primary hydroxyl functionality.

"Substantially free," with respect to the ethylene oxide and propylene oxide moieties, means that less than 5 wt-% ethylene oxide and propylene oxide moieties are present in the ethylenically unsaturated compound. "Essentially free" means that less than 1 wt-% ethylene oxide and propylene oxide moieties are present in the ethylenically unsaturated compound. "Completely free" means that less than 0.5 wt-% ethylene oxide and propylene oxide moieties are present in the ethylenically unsaturated compound.

"Substantially free," with respect to the primary hydroxyl functionality, refers to compounds that have a primary OH-functionality of no more than 30 milliequivalents KOH/gram (meq/g). "Essentially free" of primary hydroxyl functionality refers to compounds that have a primary OH-functionality of no more than 25 milliequivalents KOH/gram (meq/g). "Completely free" of primary hydroxyl functionality refers to compounds that have a primary OH-functionality of no more than 20 milliequivalents KOH/gram (meq/g).

Preferred ethylenically unsaturated compounds have an average ethylenically unsaturated functionality of at least 3.0, and more preferably at least 4.0. Preferably the average ethylenically unsaturated functionality is no more than 8.0.

Preferably, ethylenically unsaturated compounds have a viscosity at 25° C. of no greater than 2,000 cps.

Suitable ethylenically unsaturated compounds include a (meth)acrylate, a vinyl ether, a (meth)allyl ether, or mixtures or copolymers thereof. Examples of (meth)acrylate-functional compounds include di trimethylolpropane tetraacrylate and di-trimethylolpropane tetramethacrylate. Examples of vinyl ether compounds include di-(trimethylolpropane tetravinyl ether), di-(pentaerythritol hexavinyl ether), and pentaerythritol tetravinyl ether. Examples of (meth)allyl ether compounds include di-(trimethylolpropane tetraallyl ether), di-(trimethylolpropane tetramethallyl ether), di(pentaerythritol hexaallyl ether), di-(pentaerythritol hexamethallyl ether), pentaerythritol tetraallyl ether, and pentaerythritol tetramethallyl ether. Preferred ethylenically unsaturated compounds are (meth)acrylate functional, which include acrylate functionality and methacrylate functionality. Preferred ethylenically unsaturated compounds include (meth)acrylate functional compounds. Of these, the preferred compounds are di-(trimethylolpropane tetraacrylate) and di-(trimethylolpropane tetramethacrylate). Ethylenically unsaturated compounds used in coating compositions of the present invention if desired can include mixtures of compounds.

Polymers suitable for the coating compositions of the present invention include latex polymers, and optionally other polymers, particularly water-dispersible polymers. In certain preferred embodiments, compositions of the present invention include a latex polymer and a water-dispersible polymer. Both latex and water-dispersible polymers are well-known in the coating industry and include a wide variety of polymers.

The polymers may include reactive functionalities that are capable of reacting with the aforementioned ethylenically unsaturated compounds. One such preferred polymer includes ethylenic unsaturation and, when cured, provides a hard, durable coating. Such ethylenic unsaturation is preferably in the form of (meth)acrylate or auto-oxidative carbon-carbon double bonds.

In certain embodiments, the latex polymer is preferably prepared through chain-growth polymerization, using, for example, ethylenically unsaturated monomers via an emulsion process. Examples of ethylenically unsaturated monomers are selected from the group consisting of acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidylether, acrylamide, methylacrylamide, styrene, a-methyl styrene, vinyl toluene, vinyl acetate, vinyl propionate, allyl methacrylate, and mixtures thereof.

Preferably, the ethylenically unsaturated monomers used in the preparation of the latex polymer include styrene. In certain embodiments, the coating composition includes no greater than 75 percent by weight (wt-%) styrene, and in other embodiments, no greater than 50 wt-%, based on the total weight of the latex polymer composition. In certain embodiments, the level of styrene is no less than 10 wt-%, in other embodiments, no less than 20 wt-%, based on the total weight of the latex polymer composition.

A water-soluble free radical initiator is typically used in the chain growth polymerization of a latex polymer. Suitable water-soluble free radical initiators include hydrogen peroxide; tert-butyl peroxide; alkali metal persulfates such as sodium, potassium and lithium persulfate; ammonium persulfate; and mixtures of such initiators with a reducing agent. Reducing agents include: sulfites, such as alkali metal metabisulfite, hydrosulfite, and hyposulfite; sodium formaldehyde sulfoxylate; and reducing sugars such as ascorbic acid and isoascorbic acid. The amount of initiator is preferably at least 0.01 wt-%, and preferably no greater than 3 wt-%, based on the total amount of monomer. In a redox system, the amount of reducing agent is preferably at least 0.01 wt-%, and preferably no greater than 3 wt-%, based on the total amount of monomer. The temperature or polymerization of a latex polymer is preferably at least 10° C., and preferably no greater than 100° C.

The latex polymers are typically stabilized by one or more emulsifying agents, such as nonionic or anionic emulsifiers (i.e., surfactants), used either alone or together. Examples of suitable nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl) phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene(20)lauramide, N-lauryl-N-polyoxyethylene(3) amine and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyidiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin ($C_{14}$-$C_{16}$)sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate.

The latex polymer may also be stabilized with an alkali-soluble polymer. Alkali-soluble polymers may be prepared by making a polymer with acrylic or methacrylic acid or other polymerizable acid monomer (usually greater than 8%) and solubilizing the polymer by addition of ammonia or other base. Examples of suitable alkali-soluble support polymers are JONCRYL 675 and JONCRYL 678.

In certain embodiments, suitable latex and water-dispersible polymers, particularly the water-dispersible polymers, include polyurethanes, epoxies, polyamides, chlorinated polyolefins, acrylics, oil-modified polymers, polyesters, and mixtures or copolymers thereof, for example. Such polymers are readily synthesized. If desired, they can be made to be water dispersible using conventional techniques. For example, the incorporation of amine or acid functionality produces water dispersibility. Such polymers can also be regarded as latex polymer via stabilization with one or more emulsifying agents (e.g., surfactants) and mixed with water.

Oil-modified polymers can also be used if desired, whether water dispersible or water insoluble and stabilized by one or more emulsifying agents (e.g., surfactants). As used herein, oil-modified polymers are broadly defined to include polymers that contain oils and/or oil based derivatives such as glyceride oils (monoglycerides, diglycerides, and the like), fatty acids, fatty amines, and mixtures thereof. Examples of such oil-modified polymers include, alkyds, oil-modified polyurethanes, oil-modified epoxies, oil-modified polyamides, oil-modified acrylics, and mixtures or copolymers thereof. Preferably, the oil-modified polymer is an oil-modified polyurethane or an alkyd. Such polymers are readily synthesized and can be made to be water dispersible if desired using conventional techniques.

In certain embodiments, water-dispersible polyurethanes are particularly preferred. These polymers may be made in a variety of ways. One suitable method includes reacting one or more isocyanates with one or more hydroxy-functional compounds. Preferred such polymers include ethylenic unsaturation as well as salt-forming functionality. The ethylenic unsaturation can be introduced into a polyurethane, for example, by reacting the aforementioned isocyanate with a hydroxy-functional acrylate, methacrylate, allyl ether, vinyl ether, monoglyceride, diglyceride, an ester polyol, or oil-modified polymers. The preferred oil-modified polymer useful in preparing an ethylenic unsaturated polyurethane is an alkyd. Preferred ethylenically unsaturated polyurethanes include (meth)acrylate or auto-oxidative carbon-carbon double bond functionality.

Suitable isocyanates include diisocyanates, triisocyanates, and other polyisocyanates. Preferred polyisocyanates for practicing the invention are polyisocyanates having 4 to 25 carbon atoms and 2 to 4 isocyanate groups per molecule. Examples of isocyanates are those conventionally used in making polyurethanes, including aliphatic, cycloaliphatic, aromatic isocyanates, and mixtures thereof.

Suitable hydroxy-functional ethylenically unsaturated compounds for reaction with the isocyanate include hydroxy-functional (meth)acrylates. Examples of suitable hydroxy-functional (meth)acrylates include alkyl and cycloalkyl hydroxy-functional (meth)acrylates, such as 2-hydroxyethyl (meth)acrylates, 3-hydroxypropyl (meth)acrylates, 4-hydroxybutyl (meth)acrylates, 2-hydroxy-2-methylethyl (meth)acrylates, and 4-hydroxycyclohexyl (meth)acrylates, as well as other similar hydroxy-functional aliphatic (meth) acrylates. Other suitable hydroxy-functional (meth)acrylates include hydroxy-functional (meth)acrylate polyesters such as caprolactone 2-((meth)acryloyloxy)ethyl esters, dicaprolactone 2-((meth)acryloyloxy)ethyl esters, and higher molecular weight caprolactone homologues, and hydroxy-functional (meth)acrylate polyethers.

Another type of hydroxy-functional ethylenically unsaturated compound for use in making polyurethanes is a hydroxy-functional (meth)allyl ether. Suitable hydroxy-functional (meth)allyl ethers include at least one hydroxyl group and one or more allyl ether groups, such as hydroxyethyl allyl ether, hydroxypropyl allyl ether, trimethylolpropane monoallyl ether, trimethylolpropane diallyl ether, trimethylolethane monoallyl ether, trimethylolpropane dimethallyl ether, and the like.

Vinyl ethers may also be utilized in making ethylenically unsaturated polyurethanes. A suitable vinyl ether compound includes at least one hydroxyl group and one or more vinyl ether groups. Examples of suitable vinyl ethers include 4-hydroxybutyl vinyl ether, cyclohexanedimethanol monovinyl ether, ethylene glycol monovinyl ether, diethylene glycol monovinyl ether, and the like.

Ethylenic unsaturation can also be incorporated into a polyurethane via reaction with an ester polyol made by reaction of an aromatic or aliphatic polyol containing at least two hydroxyl groups per molecule with a fatty acid wherein a portion of the fatty acid contains auto-oxidative carbon-carbon double bonds. Suitable polyols include ethylene glycol, ethylene glycol, proplylene glycol, 1,3-propane diol, 1,3-butylene glycol, 1,4-butane diol, Bisphenol A, trimethylol propane, trimethylol ethane, pentaerythritol, glycerin, neopentyl glycol, and cyclohexane dimethanol, and mixtures thereof. Suitable unsaturated fatty acids include linoleic, palmitoleic, linolenic, eleostearic, arachidonic, ricinoleic acids, 10,12-octadecadienoic acid, and mixtures thereof.

Polyurethanes containing ethylenic unsaturation can also be developed by utilizing the reaction product formed via transesterification of an oil, containing auto-oxidative carbon-carbon double bonds, with an aromatic or aliphatic polyol containing at least two hydroxyl groups per molecule. Suitable oils include linseed oil, soybean oil, safflower oil, tall oil, sunflower oil, dehydrated caster oil, castor oil, ricine oil, tung oil, sardine oil, olive oil, cottonseed oil and mixtures thereof. Suitable polyols include ethylene glycol, proplylene glycol, 1,3-propane diol, 1,3-butylene glycol, 1,4-butane diol, Bisphenol A, trimethylol propane, trimethylol ethane, pentaerythritol, glycerin, neopentyl glycol, and cyclohexane dimethanol, and mixtures thereof.

Oil-modified polymers, preferably, hydroxyl-functional alkyds, can also be used to develop ethylenic unsaturated polyurethanes. Alkyds can be prepared by any method known in the art. An example of a method to prepare an alkyd includes the transesterification of an oil and polyol with a further reaction with polybasic acids and optionally, further polyols. In addition, polybasic acids and fatty acids can be reacted with polyols in suitable proportions. The reaction of the polyols with polybasic acids and fatty acids and/or oils can be catalyzed by transesterification catalysts such as calcium naphthenate, lithium neodecanoate, zinc acetate, tin oxide and the like. A color stabilizer such as trisnonyl phenyl phosphite may also be added.

Suitable oils and/or fatty acids derived therefrom that are useful in making an alkyd or other oil-modified polymer include compounds such as, for example, linseed oil, safflower oil, tall oil, cotton seed oil, ground nut, wood oil, tung oil, ricine oil, sunflower oil, soya oil, castor oil, dehydrated castor oil, coconut oil, sardine oil, olive oil, and the like. These oils and/or fatty acids can be used alone or as a mixture of one or more of the oils and/or fatty acids.

Suitable polyols useful in making an alkyd include compounds such as, for example, aliphatic, cycloaliphatic and/or araliphatic alcohols having 1 to 6, preferably 1 to 4, hydroxy groups attached to nonaromatic or aromatic carbon atoms, such as, for example, ethylene glycol, proplylene glycol, 1,3-propane diol, 1,3-butylene glycol, 1,4-butane diol, Bisphenol A, trimethylol propane, trimethylol ethane, pentaerythritol, glycerin, neopentyl glycol, and cyclohexane dimethanol. These compounds can be used alone or as a mixture of one or more polyols.

Suitable polybasic acids useful in making an alkyd include compounds such as, for example, aliphatic, cycloaliphatic saturated or unsaturated and/or aromatic polybasic carboxylic acids, such as, for example, dicarboxylic, tricarboxylic, and tetracarboxylic acids. Polybasic acids are broadly defined to include anhydrides of the polybasic acids such as, for example, maleic anhydride, phthalic anhydride, succinic anhydride, tetrahydrophthalic anhydride, hexahydrophthalic anhydride, trimellitic anhydride, or mixtures thereof. These compounds can be used alone or as a mixture of one or more polybasic acids.

Alkyds can also be prepared by reacting polybasic acids with a compound containing an amine to provide an amide containing alkyd. Examples of suitable amines include ethylene diamine, diethylene triamine, triethylene tetra amine, and melamine 1,2-diamino propane, 1,3-diamino propane, and the like; or amino alcohols such as, for example, 2-amino-propan-1-ol, 3-amino-propan-1-ol, dimethylisopropanolamine, 2-amino-2-methyl-1-propanol, dimethylethanolamine, and the like. These amide containing alkyds can be designed to be amine and/or hydroxy functional and subsequently could be useful in making a water dispersible polyurethane polymer.

Conventionally, to facilitate manufacture, the polyurethane prepolymer can be made in the presence of a solvent that is either left in the dispersion, or removed as one of the last steps in production to provide a low solvent or solvent-free product. Solvents that can be easily removed, are usually volatile solvents, such as acetone or methyl ethyl ketone. In place of such solvents (or a portion of such solvents), however, one or more reactive diluents as described above are used.

Chain extenders can also be used in the preparation of urethane polymers. Examples of chain extenders include an alkyl amino alcohol, cycloalkyl amino alcohol, heterocyclic amino alcohol, polyamine (e.g., ethylene diamine, diethylene triamine, etc.), hydrazine, substituted hydrazine, hydrazide, amide, water or mixtures thereof.

In general, for water-dispersible polymers, acid salt forming groups can be introduced into the polymer. This can be done by a number of methods. For example, a water-dispersible polyurethane can be made by reacting a suitable compound (e.g., a polyisocyanate) with a compound containing active hydrogen and active acid groups neutralized by a neutralizing base. Suitable compounds having active hydrogen and active acid groups include hydroxy and mercapto carboxylic acids, aminocarboxylic acids, aminohydroxy carboxylic acids, sulfonic acids, hydroxy sulfonic acids, and aminosulfonic acids. Suitable neutralizing bases include inorganic bases such as sodium hydroxide, potassium hydroxide, lithium hydroxide, ammonia, triethylamine, and dimethyl ethanol amine.

Alternatively, for water-dispersible polymers, basic salt forming groups can be introduced into the polymers by reacting a suitable compound (e.g., a polyisocyanate) with a compound containing active hydrogen groups and active basic groups neutralized with an acid. Suitable compounds having active hydrogen groups and active basic groups include aliphatic, cycloaliphatic and heterocyclic amino alcohols, diols and triols, amines, diamines, triamines, tetramines, and amides. Suitable neutralizing acids include organic acids such as formic acid and acetic acid, and inorganic acids such as hydrochloric acid and sulfuric acid.

For example, urethanes can be made water-dispersible by incorporating amine or acid functionality. For example, water-based anionically stabilized polyurethane polymers are prepared by reacting polyols and dihydroxy carboxylic acid compounds with an excess of diisocyanate to provide a carboxylic acid functional prepolymer having NCO terminal groups. The acid groups can be neutralized with tertiary amines to provide salt groups. The neutralized prepolymer can be readily dispersed in water. Alternatively, the anionic stabilizing group of the water-dispersible polyurethane polymers can be replaced with cationic stabilizing groups or nonionic stabilizing groups, to facilitate water dispersibility. Thus, a water-dispersible polyurethane polymer can rendered water dispersible by anionic stabilization of either an acid or a base.

Suitable additives for use in coating compositions of the present invention are described in Koleske et al., *Paint and Coatings Industry*, April, 2003, pages 12-86.

In particular, compositions including a latex polymer also include an emulsifying agent, such as a nonionic or anionic emulsifier (i.e., surfactant), as described above. Such surfactants not only create an emulsion of polymer particles in water, but assist incorporation of the substantially non-irritating ethylenically unsaturated compound.

Certain embodiments of the present invention include polymers that are curable by UV or visible light. These coating compositions typically include a free-radical initiator, particularly a photoinitiator that induces the curing reaction upon exposure to light. The photoinitiator is preferably present in an amount of at least 0.1 wt-%, based on the total weight of the coating composition. The photoinitiator is preferably present in an amount of no greater than 10 wt-%, based on the total weight of the coating composition.

Among photoinitiators suitable for use in the present invention with resins having (meth)acrylate or allyl ether functional groups are alpha-cleavage type photoinitiators and hydrogen abstraction type photoinitiators. The photoinitiator may include other agents such as a coinitiator or photoinitiator synergist that aid the photochemical initiation reaction. Suitable cleavage type photoinitiators include alpha, alpha-diethoxyacetophenone (DEAP), dimethoxyphenylacetophenone (commercially available under the trade designation IRGACURE 651 from Ciba Corp., Ardsley, N.Y.), hydroxy-cyclo-hexylphenylketone (commercially available under the trade designation IRGACURE 184 from Ciba Corp.), 2-hydroxy-2-methyl-1-phenylpropan-1-one (commercially available under the trade designation DAROCUR 1173 from Ciba Corp.), a 25:75 blend of bis-(2,6-dimethoxybenzoyl)-2,4,4-trimethylpentyl phosphine oxide and 2-hydroxy-2-methyl-1-phenylpropan-1-one (commercially available under the trade designation IRGACURE 1700 from Ciba Corp.), a 50:50 blend of 2-hydroxy-2-methyl-1-phenylpropan-1-one and 2,4,6-trimethylbenzoyl-diphenylphosphine oxide (TPO, commercially available under the trade designation DAROCUR 4265 from Ciba Corp.), phosphine oxide, 2,4,6-trimethyl benzoyl (commercially available under the trade name IRGACURE 819 and IRGACURE 819DW from Ciba Corp.), 2,4,6-trimethylbenzoyl-diphenylphosphine oxide (commercially available under the trade designation LUCIRIN from BASF Corp., Mount Olive, N.J.), and a mixture of 70% oligo 2-hydroxy-2-methyl-4-(1-methylvinyl)phenylpropan-1-one and 30% 2-hydroxy-2-methyl-1-phenylpropan-1-one) (commercially available under the trade designation KIP 100 from Sartomer, Exton, Pa.). Suitable hydrogen abstraction-type photoinitiators include benzophenone, substituted benzophenones (such as that commercially available under the trade designation ESCACURE TZT from Fratelli-Lamberti, sold by Sartomer, Exton, Pa.), and other diaryl ketones such as xanthones, thioxanthones, Michler's ketone, benzil, quinones, and substituted derivatives of all of the above. Preferred photoinitiators include DAROCUR 1173, KIP 100, benzophenone, and IRGACURE 184. A particularly preferred initiator mixture is commercially available under the trade designation IRGACURE 500 from Ciba Corp., which is a mixture of IRGACURE 184 and benzophenone, in a 1:1 ratio. This is a good example of a mixture of an alpha-cleavage type photoinitiator and a hydrogen abstraction-type photoinitiator. Other mixtures of photoinitiators may also be used in the coating compositions of the present invention. Camphorquinone is one example of a suitable photoinitiator for curing a coating composition with visible light.

A coating composition of the present invention can also include a coinitiator or photoinitiator synergist. The coinitiators can be tertiary aliphatic amines (such as methyl diethanol amine and triethanol amine), aromatic amines (such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate, (meth)acrylated amines (such as those commercially available under the trade designations EBECRYL 7100 and UVECRYL P104 and P115, all from UCB RadCure Specialties, Smyrna, Ga.), and amino-functional acrylate or methacrylate resin or oligomer blends (such as those commercially available under the trade designations EBECRYL 3600 or EBECRYL 3703, both from UCB Rad-Cure Specialties). Combinations of the above categories of compounds may also be used.

Preferred photoinitiators include benzophenone, 4-methylbenzophenone, benzoyl benzoate, phenylacetophenones, 2,2-dimethoxy-2-phenylacetophenone, alpha,alpha.-diethoxyacetophenone, hydroxycyclo-hexylphenylketone, 2-hydroxy-2-methyl-1-phenylpropan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one, 2,4,6-trimethylbenzoyl-diphenylphosphine oxide, or combinations thereof.

Coating compositions having resins with vinyl ether functional groups can be cured by UV or visible light using cationic-generating photoinitiators. Examples of suitable cationic-generating photoinitiators include super acid-generating photoinitiators, such as triarylsulfonium salts. One useful triarylsulfonium salt is triphenyl sulfonium hexafluorophosphate.

Many coating compositions that may be cured by UV or visible light may also be cured with an electron beam. Techniques and devices for curing a coating composition using an electron beam are known in the art. These techniques do not require a photoinitiator for electron beam cure of the coating.

Coating compositions having polymer resins with (meth)acrylate and/or allyl functional groups may also be thermally cured using a suitable initiator. The thermal initiator typically facilitates the curing process by a free radical mechanism and typically includes a peroxide or azo compound. Peroxide compounds suitable for use as initiators in the coating compositions of the present invention include t-butyl perbenzoate, t-amyl perbenzoate, cumene hydroperoxide, t-amyl peroctoate, methyl ethyl ketone peroxide, benzoyl peroxide, cyclohexanone peroxide, 2,4-pentanedione peroxide, di-t-butyl peroxide, t-butyl hydroperoxide, and di-(2-ethylhexyl)-peroxydicarbonate. Suitable azo compounds which may be employed as an initiator in the present compositions include 2,2-azo bis-(2,4-dimethylpentane-nitrile), 2,2-azo bis-(2-methylbutanenitrile), and 2,2-azo bis-(2-methylpropanenitrile).

For coating compositions having a mixture of (meth)acrylate, allyl ether, and vinyl ether functional groups, a combination of curing procedures may be used. For example, a coating composition having a resin with both (meth)acrylate and vinyl ether functional groups typically includes an alpha-cleavage type and/or hydrogen abstraction type photoinitiator for the (meth)acrylate groups and a cationic-generating photoinitiator for the vinyl ether groups.

Other methods for curing the coating compositions of the invention can be used alone or in combination with methods described hereinabove. Supplemental curing methods include heat cure, chemical cure, anaerobic cure, moisture cure, oxidative cure, and the like. Each method of cure requires a corresponding curing initiator or curing agent, which is included in the composition. For example: heat cure can be induced by peroxides; metal drier packages can induce an oxidative cure; multifunctional amines (for example isophorone diamine) can effect a chemical crosslinking cure through Michael addition of amine groups onto acrylate reactive unsaturated groups. If these additional initiators are present in the coating composition they are preferably present in an amount of at least 0.1 wt-%, based on the weight of the coating composition. Preferably, they are preferably present in an amount of no greater than 12 wt-%, based on the weight of the coating composition. Means for effecting cures by such methods are known to those of skill in the art or can be determined using standard methods.

Certain coating compositions of the invention also can include metal driers. Typical driers include, for example, cobalt, manganese, lead, zirconium, calcium, cerium, lanthanum, and neodymium salts or combinations thereof. Metal driers can be used in combination with accelerators for certain embodiments. For example, water-dispersible polyurethane-polyethylene compositions can also include compounds such as, for example, 1,10-phenanthroline, bipyridine, and the like, which function as accelerators in combination with the metal driers.

Certain coating compositions of the present invention may also include one or more of a group of ingredients that can be called performance enhancing additives. Typical performance enhancing additives that may be employed include surface active agents, pigments, colorants, dyes, surfactants, thickeners, heat stabilizers, leveling agents, anti-cratering agents, curing indicators, plasticizers, fillers, sedimentation inhibitors, ultraviolet-light absorbers, optical brighteners, and the like to modify properties.

Coating compositions of the present invention may also include ultraviolet-light (UV) absorbers and hindered amine light stabilizers (HALS), either individually or as blends. Suitable UV absorbers and HALS are known to those skilled in the art or can be determined using standard methods. Exemplary UV absorbers include, Tinuvin 292 and Tinuvin 1130 (Ciba-Geigy) and Fadex JM (Clariant). Suitable examples of HALS include, Tinuvin 152 and Tinuvin 292 (Ciba-Geigy). Commercial blends of UV absorbers and HALS such as Sanduvor TB-02 (Clariant) may also be used.

Coating compositions may include a surface-active agent that modifies the interaction of the curable coating composition with the substrate, in particular, the agent can modify the ability of the composition to wet a substrate. Surface active agents may have other properties as well. For example, surface active agents may also include leveling, defoaming, or flow agents, and the like. The surface active agent affects qualities of the curable coating composition including how the coating composition is handled, how it spreads across the surface of the substrate, and how it bonds to the substrate. If it is used, the surface active agent is preferably present in an amount of no greater than 5 wt-%, based on the total weight of the coating composition.

Surface active agents have also been found to assist incorporation of the substantially non-irritating ethylenically unsaturated compound. Surface active agents suitable for use in coating compositions are known to those of skill in the art or can be determined using standard methods. Exemplary surface active agents include polydimethylsiloxane surface active agents (such as those commercially available under the trade designations SILWET L-760 and SILWET L-7622 from OSI Specialties, South Charleston, W. Va., or BYK 306, BYK 333, and BYK 346 from Byk-Chemie, Wallingford, Conn.) and fluorinated surface active agents (such as that commercially available as FLUORAD FC-430 from 3M Co., St. Paul, Minn.). The surface active agents may include a defoamer. Suitable defoamers include polysiloxane defoamers (such as a methylalkylpolysiloxane like that commercially available under the trade designation BYK 077 or BYK 500 from Byk-Chemie) or polymeric defoamers (such as that commercially available under the trade designation BYK 051 from Byk-Chemie).

For some applications, a coating that is opaque, colored, pigmented or has other visual characteristics is desired. Agents to provide such properties can also be included in coating compositions of the present invention. Pigments for use with the present invention are known in the art. Suitable pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, and/or organic yellows (such as Hansa yellow). The composition can also include a gloss control additive or an optical brightener, such as that commercially available under the trade designation UVITEX OB from Ciba-Geigy.

In certain embodiments it is advantageous to include fillers or inert ingredients in the coating composition. Fillers and inert ingredients include, for example, clay, glass beads, calcium carbonate, talc, silicas, organic fillers, and the like. Fillers extend, lower the cost of, alter the appearance of, or provide desirable characteristics to the composition before and after curing. Suitable fillers are known to those of skill in the art or can be determined using standard methods. Fillers or inert ingredients are preferably present in an amount of at least 0.1 wt-%, based on the total weight of the coating composition. Fillers or inert ingredients are preferably present in an amount of no greater than 40 wt-%, based on the total weight of the coating composition.

The invention may also include other ingredients that modify properties of the curable coating composition as it is stored, handled, or applied, and at other or subsequent stages. Waxes, flatting agents, mar and abrasion additives, and other similar performance enhancing additives may be employed in this invention as required in amounts effective to upgrade the performance of the cured coating and the coating composition. Desirable performance characteristics of the coating include chemical resistance, abrasion resistance, hardness, gloss, reflectivity, appearance, or combinations of these characteristics, and other similar characteristics.

The present invention also provides a method of preparing a coating composition.

In one embodiment, the method involves: mixing water, a latex polymer, and a substantially non-irritating ethylenically unsaturated compound, wherein the ethylenically unsaturated compound: has a molecular weight of at least 350 grams/mole, is substantially free of ethylene oxide moieties, propylene oxide moieties, and primary hydroxyl functionality, has a vinyl functionality of at least 3.0, and has a viscosity at 25° C. of no greater than 2,000 cps.

In one embodiment, the method involves: mixing water, a surfactant, and a substantially non-irritating ethylenically unsaturated compound, wherein the ethylenically unsaturated compound: has a molecular weight of at least 350 grams/mole, is substantially free of ethylene oxide moieties, propylene oxide moieties, and primary hydroxyl functionality, has a vinyl functionality of at least 3.0, and has a viscosity at 25° C. of no greater than 2,000 cps; and blending this mixture with a latex polymer and water.

In one embodiment, the method involves: providing a first mixture that includes a water-dispersible polymer (preferably, a water-dispersible polyurethane polymer) and a substantially non-irritating ethylenically unsaturated compound, wherein the ethylenically unsaturated compound: has a molecular weight of at least 350 grams/mole, is substantially free of ethylene oxide moieties, propylene oxide moieties, and primary hydroxyl functionality, has a vinyl functionality of at least 3.0, and has a viscosity at 25° C. of no greater than 2,000 cps; providing a second mixture that includes water and a latex polymer; and combining the first and second mixtures to form the coating composition. Preferably, combining the first and second mixtures includes dispersing the first mixture in the second mixture. If the water-dispersible polymer is a polyurethane polymer, the method may further include chain extending the water-dispersible polyurethane polymer after combining the first and second mixtures.

EXAMPLES

Objects and advantages of this invention are further illustrated by the following examples, but the particular materials and amounts thereof recited in these examples, as well as other conditions and details, should not be construed to unduly limit this invention.

The following abbreviations have been used herein:
DMPA—Dimethylolpropionic acid (GEO, Allentown, Pa.)
DiTMPTA—Di-trimethylolpropane tetraacrylate (Sartomer, Exton, Pa.)
4-HBA—4-Hydroxy butylacrylate (Aldrich, Milwaukee, Wis.)
TMP—Trimethylol Propane (Aldrich)
DESMOPHEN S-105-110—Polyester diol (Bayer, Pittsburgh, Pa.)
TEA—Triethyl Amine (Aldrich)
DBTDL—Dibutyl Tin Dilaurate (Air Products, Allentown, Pa.)

Rhodapon UB—Sodium Lauryl Sulfate (Rhodia, Cranbury, N.J.)

Example 1

A reactor is charged with 866 grams of deionized water and 35.1 grams of Rhodapon UB. The reaction mixture is heated to 75° C. under a nitrogen blanket. During heating, a premulsion is formed comprising: 249.7 grams of deionized water, 17.3 grams of Rhodapon UB, 356.5 grams of butyl acrylate, 268.2 grams of methyl methacrylate, 117.1 grams of styrene, and 39 grams of methacrylic acid. Once the reaction mixture reaches 75° C., 10% of the preemulsion is added to the reactor followed by the addition of a mixture of 3.9 grams of ammonium persulfate and 10 grams of water. The reaction is held 5-10 minutes, whereupon an exotherm results and then the remaining preemulsion is fed into the reactor vessel over 2 hours. The reaction temperature is held between 80-85° C., during polymerization. Once the preemulsion feed is complete, the container is rinsed with 9 grams of deionized water and the reaction is held 30 minutes. Once the 30 minute hold is complete, the resulting latex polymer is cooled to 40° C. and 12 grams of 28% ammonia is added to adjust the pH to 8.0-8.5 and deionized water is added to adjust the weight solids to 40%.

Example 2

Under agitation to a stainless steel mixing vessel is added 100 grams of deionized water, 14.2 grams of Rhodapon UB, and 200 grams DiTMPTA. The mixture is blended until a preemulsion forms.

Under agitation to a stainless steel mixing vessel is added 1000 grams of latex polymer from Example 1, 93 grams of deionized water, and 157 grams of the DiTMPTA preemulsion prepared above. This mixture is then held under agitation for 8 hours until the DiTMPTA migrates into the latex polymer. 15 grams of Irgacure 500 is then added to the mixture and held under agitation for another 15 minutes. The mixture is then left overnight to allow the release of any entrapped air.

The resulting mixture is substancially non-irritating and will cure to a hard, chemically resistant finish upon exposure to ultraviolet light. The resulting mixture form Example 2 will also cure to a hard, chemically resistant finish without the need of photo initiator under electron bam radiation.

Example 3

A reactor is charged with 146 parts DiTMPTA, 21.9 parts 4-HBA, 33.5 parts DESMOPHEN S-105-110 polyester diol, 10.3 parts DMPA, 2.9 parts TMP, 77.5 parts isophorone diisocyanate, and 500 ppm of 2,6 di-tert-butyl-4-methylphenol. The reaction mixture is heated to 80° C. under an air sparge, where upon 250 ppm DBTDL is added and the reaction processed until the isocyanate level is below 3.8%. The urethane polymer is cooled to 65° C. and then neutralized with 7.7 parts TEA. Use of DiTMPTA as a reactive diluent in this example will allow the urethane polymer viscosity at 65° C. to be less than 5,000 centipoise (cps) as measured by a Brookfield DV-I+ Viscometer and a Number 31 spindle at 1.5 revolutions per minute (RPM). Dispersing a urethane polymer into water is typically enhanced at a transfer viscosity below 20,000 cps.

At a process temperature of 65° C., the (meth)acrylate urethane polymer formed above is then dispersed into a mixture of 395 parts room temperature deionized water and 750 parts latex polymer from Example 1 and subsequently chain extended with 11.5 parts hydrazine (35% in water). The dispersion is then adjusted to 40% solids with deionized water.

The physical properties of the chain extended (meth)acrylate functional polyurethane dispersion are as follows (NVM %=nonvolatile material by weight):

| | EXAMPLE 1 |
|---|---|
| NVM % | 40% |
| % VOC | 0.5% (TEA) |

Under agitation, to 100 grams of the mixture from Example 3 may be added 1 gram of Irgacure 500. The mixture would then be held for 15 minutes. The resulting mixture is substancially non-irritating and will cure to a hard, chemically resistant finish upon exposure to ultraviolet light. The resulting mixture from Example 3 will also cure to a hard, chemically resistant finish without the need of photo initiator under electron beam radiation.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A coating composition comprising:
    a polymer component comprising a latex polymer prepared via chain-growth polymerization;
    a substantially non-irritating ethylenically unsaturated compound; and
    water;
    wherein the substantially non-irritating ethylenically unsaturated compound:
        has a molecular weight of at least 350 grams/mole,
        is substantially free of ethylene oxide moieties, propylene oxide moieties, and primary hydroxyl functionality,
        has an average ethylenically unsaturated functionality of at least 3.0,
        has a viscosity at 25° C. of no greater than 2,000 cps, and
        is present in the coating composition in an amount of 5 wt-% to 25 wt-%, based on the total weight of the ethylenically unsaturated compound and the polymer component.

2. The coating composition of claim 1 wherein the latex polymer is prepared from ethylenically unsaturated monomers.

3. The coating composition of claim 2 wherein the ethylenically unsaturated monomers comprise styrene.

4. The coating composition of claim 3 wherein the level of styrene is no greater than 75 wt-%, based on the total weight of the latex polymer composition.

5. The coating composition of claim 3 wherein the level of styrene is no less than 10 wt-%, based on the total weight of the latex polymer composition.

6. The coating composition of claim 1 wherein the polymer component further comprises a water-dispersible polymer.

7. The coating composition of claim 1 wherein the ethylenically unsaturated compound comprises (meth)acrylate functionality, vinyl ether functionality, (meth)allyl ether functionality, or mixtures thereof.

8. The coating composition of claim 1 further comprising a free-radical initiator.

9. The coating composition of claim 8 wherein the free-radical initiator comprises a photoinitiator, a thermal initiator, a catalyst for auto-oxidative cure, or combinations thereof.

10. The coating composition of claim 9 wherein the free radical initiator is a photoinitiator.

11. The coating composition of claim 1 wherein the ethylenically unsaturated compound has a molecular weight of 350 grams/mole to 1000 grams/mole.

12. The coating composition of claim 1 comprising no more than 7 wt-% volatile organic compounds, based on the total weight of the composition.

13. A method of coating comprising applying the coating composition of claim 1 to a substrate and allowing the coating composition to harden.

14. A method of coating comprising applying the coating composition of claim 1 to a cement-containing substrate and allowing the coating composition to harden.

15. A coating preparable by the method of claim 13.

16. A coating composition comprising:
a polymer component comprising a latex polymer prepared via chain-growth polymerization, and one or more water-dispersible polymers selected from the group consisting essentially of epoxies sol amides chlorinated sol olefins acrylics, oil modified polymers polyesters, and mixtures or copolymers thereof;
a substantially non-irritating ethylenically unsaturated compound, which is present in an amount of 5 wt-% to 25 wt-%, based on the total weight of the ethylenically unsaturated compound and the polymer component; and
water;
wherein the substantially non-irritating ethylenically unsaturated compound:
has a molecular weight of at least 350 grams/mole,
is substantially free of ethylene oxide moieties, propylene oxide moieties, and primary hydroxyl functionality,
has an average ethylenically unsaturated functionality of at least 3.0, and
has a viscosity at 25° C. of no greater than 2,000 cps.

17. The coating composition of claim 16 wherein the latex polymer is prepared from ethylenically unsaturated monomers selected from the group consisting of acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidylether, acrylamide, methylacrylamide, styrene, α-methyl styrene, vinyl toluene, vinyl acetate, vinyl propionate, ally methacrylate, and mixtures thereof.

18. The coating composition of claim 16 wherein the ethylenically unsaturated compound comprises (meth)acrylate functionality.

19. The coating composition of claim 18 wherein the (meth)acrylate-functional compound is selected from the group consisting of di-(trimethylolpropane) tetraacrylate, di-(trimethylolpropane) tetramethacrylate, and combinations thereof.

20. The coating composition of claim 16 further comprising a photoinitiator comprising benzophenone, 4-methylbenzophenone, benzoyl benzoate, phenylacetophenones, 2,2-dimethoxy-2-phenylacetophenone, alpha,alpha-diethoxyacetophenone, hydroxycyclo-hexylphenylketone, 2-hydroxy-2-methyl-1-phenylpropan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one, 2,4,6-trimethylbenzoyl-diphenylphosphine oxide, or combinations thereof.

21. The coating composition of claim 16 wherein the ethylenically unsaturated compound is present in an amount of at least 7.5 wt-%, based on the total weight of the ethylenically unsaturated compound and the polymer component.

22. The coating composition of claim 21 wherein the ethylenically unsaturated compound is present in an amount of at least 10 wt-%, based on the total weight of the ethylenically unsaturated compound and the polymer component.

23. A coating composition comprising:
a polymer component comprising a latex polymer prepared via chain-growth polymerization from ethylenically unsaturated monomers, and a water-dispersible polymer selected from the group consisting essentially of epoxies, polyamides, chlorinated polyolefins, acrylics, oil modified polymers, polyesters, and mixtures or copolymers thereof;
a substantially non-irritating ethylenically unsaturated compound; and
water;
wherein the substantially non-irritating ethylenically unsaturated compound:
has a molecular weight of at least 350 grams/mole,
is substantially free of ethylene oxide moieties, propylene oxide moieties, and primary hydroxyl functionality,
has an average ethylenically unsaturated functionality of at least 3.0,
has a viscosity at 25° C. of no greater than 2,000 cps, and
is present in the coating composition in an amount of 5 wt-% to 25 wt-%, based on the total weight of the ethylenically unsaturated compound and the polymer component.

24. A method of coating comprising applying the coating composition of claim 23 to a substrate and allowing the coating composition to harden.

25. A method of coating comprising applying the coating composition of claim 23 to a cement-containing substrate and allowing the coating composition to harden.

26. A coating preparable by the method of claim 24.

27. A coating composition comprising:
a polymer component comprising a latex polymer prepared via chain-growth polymerization from ethylenically unsaturated monomers comprising styrene;
a substantially non-irritating ethylenically unsaturated compound; and
water;
wherein the substantially non-irritating ethylenically unsaturated compound:
has a molecular weight of at least 350 grams/mole,
is substantially free of ethylene oxide moieties, propylene oxide moieties, and primary hydroxyl functionality,
has an average ethylenically unsaturated functionality of at least 3.0,
has a viscosity at 25° C. of no greater than 2,000 cps; and
is present in the coating composition in an amount of 5 wt-% to 25 wt-%, based on the total weight of the ethylenically unsaturated compound and the polymer component.

28. A coating composition comprising:
a polymer component comprising a water-dispersible polymer, and a latex polymer prepared via chain-growth polymerization from ethylenically unsaturated monomers comprising styrene;
a substantially non-irritating ethylenically unsaturated compound; and
water;
wherein the substantially non-irritating ethylenically unsaturated compound:
  has a molecular weight of at least 350 grams/mole,
  is substantially free of ethylene oxide moieties, propylene oxide moieties, and primary hydroxyl functionality,
  has an average ethylenically unsaturated functionality of at least 3.0,
  has a viscosity at 25° C. of no greater than 2,000 cps; and
  is present in the coating composition in an amount of 5 wt-% to 25 wt-%, based on the total weight of the ethylenically unsaturated compound and the polymer component.

29. A coating composition comprising:
a polymer component consisting essentially of a latex polymer prepared via chain-growth polymerization, and one or more water-dispersible polymers selected from the group consisting essentially of epoxies, polyamides, chlorinated polyolefins, acrylics, oil modified polymers, polyesters, and mixtures or copolymers thereof;
a substantially non-irritating ethylenically unsaturated compound; and
water;
wherein the substantially non-irritating ethylenically unsaturated compound:
  has a molecular weight of at least 350 grams/mole,
  is substantially free of ethylene oxide moieties, propylene oxide moieties, and primary hydroxyl functionality,
  has an average ethylenically unsaturated functionality of at least 3.0,
  has a viscosity at 25° C. of no greater than 2,000 cps; and
  is present in the coating composition in an amount of 5 wt-% to 25 wt-%, based on the total weight of the ethylenically unsaturated compound and the polymer component.

\* \* \* \* \*

UNITED STATES PATENT AND TRADEMARK OFFICE
CERTIFICATE OF CORRECTION

| | | |
|---|---|---|
| PATENT NO. | : 7,923,513 B2 | Page 1 of 1 |
| APPLICATION NO. | : 11/281167 | |
| DATED | : April 12, 2011 | |
| INVENTOR(S) | : Killilea et al. | |

It is certified that error appears in the above-identified patent and that said Letters Patent is hereby corrected as shown below:

In column 17, line 27, claim 16, delete "epoxies sol amides chlorinated sol olefins acrylics, oil modified polymers polyesters," and insert --epoxies, polyamides, chlorinated polyolefins, acrylics, oil modified polymers, polyesters,--.

In column 17, line 55, claim 17, delete "ally" and insert --allyl--.

Signed and Sealed this
Twenty-eighth Day of June, 2011

David J. Kappos
*Director of the United States Patent and Trademark Office*